Patented May 13, 1930

1,758,420

UNITED STATES PATENT OFFICE

FRITZ AHRENS, OF BOCKENEM-ON-THE-HARZ, GERMANY, ASSIGNOR OF ONE-HALF TO HARZER ACHSENWERKE, G. M. B. H., BORNUM-ON-THE-HARZ, OF KONIGSDABLUM (POST BORNUM-ON-THE-HARZ), GERMANY, A FIRM

METHOD OF PRODUCING A COATING STABLE TOWARD ACIDS AND ALKALIS ON METALLIC ARTICLES

No Drawing. Application filed July 7, 1927, Serial No. 204,136, and in Germany May 18, 1925.

My invention relates to improvements in the method of producing a coating stable toward acids and alkalis on metallic articles, and more particularly in the method in which the said articles are coated by means of rubber. The object of the improvements is to provide a coating which adheres rigidly to the article, and which does not break even with frequent bending of the coated article. With this object in view my invention consists in first applying an intermediate coating consisting of a solution of rubber containing acid substances or substances adapted to split off acid and which may if desired be colloidal on the article, and thereafter placing thereon the final coating.

In carrying out my improved process I first prepare the surface to be coated, such for example as an acid proof reaction receptacle made from iron, by blowing sand against the same until the surface is clean and granular. Thereafter the said surface is coated once or several times with a solution of rubber to which has been previously added a reaction product produced by sulphurizing oxidizable oils by means of sulphur chloride. On the said intermediate coating I place a plate of hard or soft rubber, whereupon the receptacle is vulcanized.

I have found that a coating thus applied to the metal rigidly sticks to the metal, and in my opinion this fact is explained thereby that the acid contained in the reaction product added to the rubber solution or split off during vulcanization affects the metal and is thereafter readily substituted by a part of the sulphur. I presume that the formation of the sulfide takes place through that of the readily sulfurizable chloride. In the process the property of caoutchouc of binding the chlorine nearly in the same way as the sulphur is important.

The reaction product added to the mixture of rubber and obtained by sulfurizing oxidizable oils is manufactured for example as follows:

3 kilogrammes of rape oil, preferably Indian rape oil, are mixed with 1 kilogramme of linseed oil, and to the mixture 600 cubic centimeters of sulfuric chloride diluted in 300 cubic centimeters of benzine or benzol are added. By the reaction of the said substances hydrogen sulfide, hydrosulfide and hydrochloric acid are developed, and much heat is set free. But a part of the acid remains in the solidifying colloidal reaction product, which after cooling is added to the caoutchouc solution at the rate of 25 grammes of the reaction product to 100 grammes of the caoutchouc solution. During vulcanization of the caoutchouc coating the enclosed acid acts on the metal foundation, where it forms with the metal a readily sulfurizable chloride.

When performing the reaction of the oxidizable oils and the sulfur monochloride at increased pressure and within a closed receptacle a product is obtained which contains a larger amount of acid, which is preferable for the reason that when using the product as an addition to the rubber solution the metal is affected in a considerable degree and sulfurized, which insures reliable adhesion of the coating.

While specific terms are used in the specification and claims for purposes of definition they are not intended to limit the invention to the exact substances named, since obviously certain equivalents of caoutchouc are within the scope of the invention.

I claim:

1. The herein described method of producing on metal a coating stable towards acids and alkalis, which consists in first coating the said metal with a solution of caoutchouc containing acid substances, applying a layer of caoutchouc to such coating, and vulcanizing the same.

2. The herein described method of producing on metal a coating stable towards acids and alkalis, which consists in first coating the said metal with a solution of caoutchouc containing acid substances capable of splitting off acid, applying a layer of caoutchouc to such coating, and vulcanizing the same.

3. The herein described method of producing on metal a coating stable towards acids and alkalis, which consists in first coating the said metal with a solution of caoutchouc containing an acid colloidal substance, applying a layer of caoutchouc to said coating, and vulcanizing the same.

4. The herein described method of producing on metal a coating stable towards acids and alkalis, which consists in first coating the said metal with a solution of caoutchouc containing acid colloidal substances capable of splitting off acid, applying a layer of caoutchouc to such coating, and vulcanizing the same.

5. The herein described method of producing on metal a coating stable towards acids and alkalis, which consists in first coating the said metal with a solution of caoutchouc containing a reaction product produced by sulfurizing oxidizable oils by means of sulfur monochloride, applying a layer of caoutchouc to such coating, and vulcanizing the same.

6. The herein described method of producing on metal a coating stable towards acids and alkalis, which consists in first coating the said metal with a solution of caoutchouc containing a reaction product produced by sulfurizing under pressure oxidizable oils by means of sulfur monochloride, applying a layer or caoutchouc to such coating, and vulcanizing the same.

In testimony whereof I have affixed my signature.

FRITZ AHRENS.